United States Patent Office 3,428,063
Patented Feb. 18, 1969

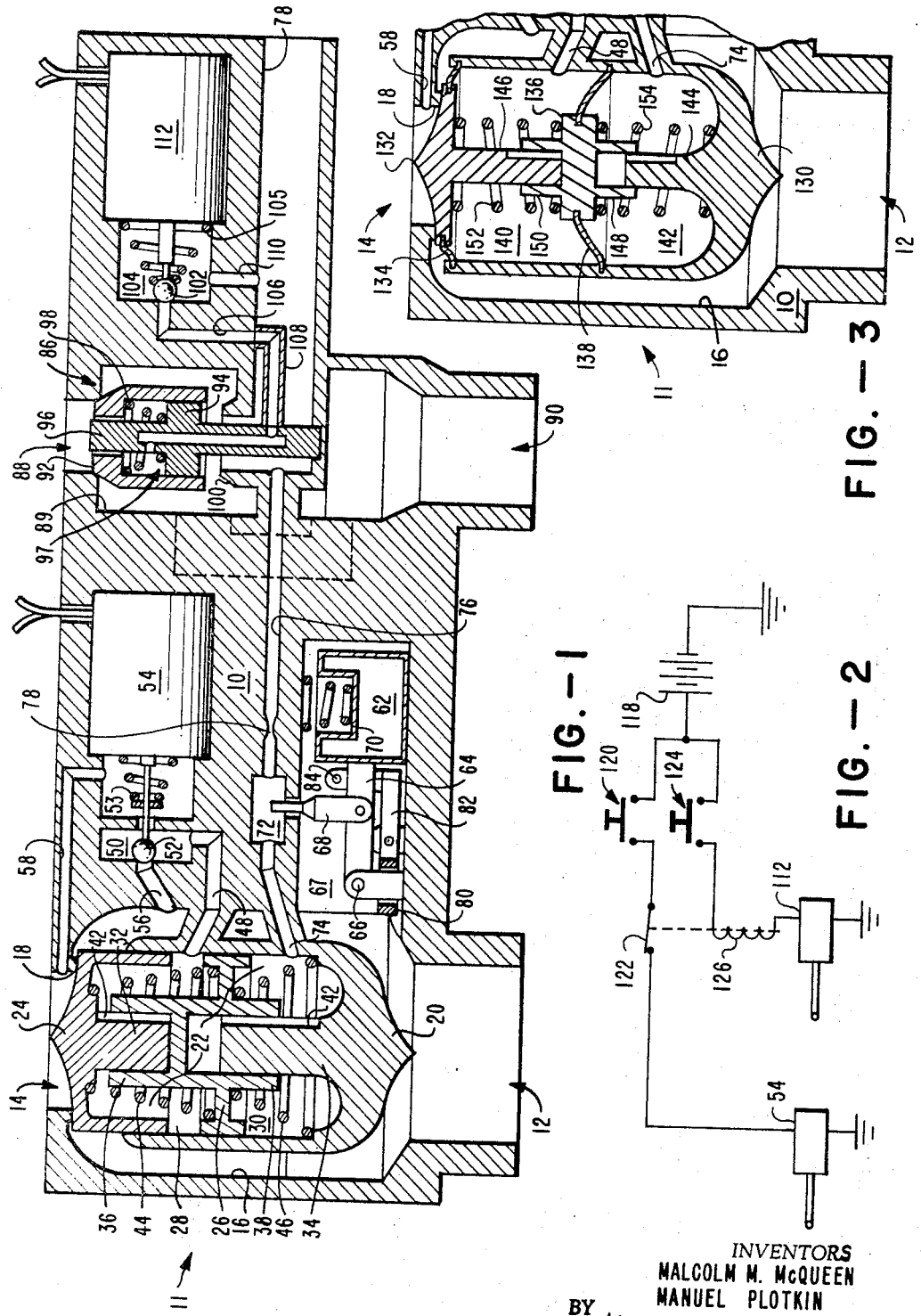

3,428,063
LIQUID TRANSFER VALVE HAVING FLOAT CONTROL AND ACCELERATION RESPONSIVE PILOT VALVE
Manuel Plotkin and Malcolm McQueen, Northridge, Calif., assignors to Whittaker Corporation, Los Angeles, Calif., a corporation of California
Filed Oct. 12, 1966, Ser. No. 586,270
U.S. Cl. 137—45
Int. Cl. B64d 37/14; G05b 9/12; B67d 5/04
19 Claims

ABSTRACT OF THE DISCLOSURE

Fluid flow control is provided by a liquid transfer valve by which liquid is passed and any accompanying gas is blocked automatically under conditions of zero or negative G. Control is exercised with regard to direction of flow by means of a solenoid controlled pilot valve which distributes according to its setting pressure differences between inlet and outlet ends of the valve. Automatic blocking of any unwanted gas which may accompany liquid flow is achieved by means of a float operated valve which is buoyed to a closed position, which allows liquid flow, by the liquid when only liquid is present but fails to be buoyed moving downwardly to an open position and cutting off the flow of liquid whenever any gas is present. Automatic blockage of gas flow is achieved for zero or negative G conditions by means of a pivoted weight arrangement which maintains the float operated valve open during such conditions, the open position corresponding to a stoppage of liquid flow.

---

This invention relates to liquid transfer valves, and more particularly to fuel transfer valves for use in aircraft and the like.

In certain aircraft and other vehicles, fuel can be stored in several different tanks at various locations. Normally, fuel is provided from a main fuel tank directly to the engine, and supplemental fuel is stored in auxiliary tanks and periodically transferred to refill the main tank. With many aircraft, particularly military aircraft, supplemental fuel is stored in external tanks that are detachably mounted on pylon structures for easy jettisoning by the pilot in emergencies. Ideally, with such arrangements, the main fuel tanks should be kept full at all times by continuously transferring fuel from the detachable external tanks so that, in an emergency requiring the external tanks to be jettisoned, a maximum supply of fuel remains in the main fuel tank and a minimum amount of fuel is wasted.

Present fuel transfer systems intended for this purpose most often employ conventional level sensing devices located in the main fuel tanks to control fuel transfer from the auxiliary tanks. As fuel in the main tank drops below a predetermined level, a transfer valve is opened or a pump is actuated by the level sensing devices to cause fuel from the auxiliary tank to refill the main tank. However, in modern high performance military aircraft, zero and negative G conditions and high acceleration forces are frequently encountered. Under these conditions, proper fuel transfer becomes much more difficult since simple level sensing arrangements are unable to operate effectively. Moreover, if the main fuel tank is not completely full, then the outlet may be uncovered during maneuvers, particularly during negative G conditions, thus permitting air or other gases present within the tank to enter the main fuel line. This is likely to result in a vapor lock at the main fuel pump and otherwise cause severe engine malfunction because of the interrupted fuel supply to the engine.

Therefore, it is an object of the present invention to provide an improved liquid transfer valve that prevents transfer of air and other gases therethrough, and effectively purges gases from the liquid being transferred.

Another object of the present invention is to provide a solenoid actuated liquid transfer valve that operates automatically to prevent the passage of gases therethrough, even during zero or negative G conditions.

A further object of the present invention is to provide a transfer valve for use in liquid fuel transfer systems to permit continuous liquid flow from a continuously pressurized auxiliary fuel tank to a substantially unpressurized main fuel tank, while preventing transfer of the pressurizing gas.

Another object of the present invention is to provide a signal actuated liquid transfer valve for aircraft that discriminates between gas and liquids to close automatically and remain closed when gas is present at the valve inlet or whenever a negative G condition is encountered, and that operates automatically to bleed gases from the inlet to permit further liquid to flow.

These and other objects are accomplished in accordance with the preferred embodiment of the invention by providing a two-way, pilot operated liquid transfer valve arrangement for installation in fuel lines between auxiliary and main fuel tanks. Liquid is transferred in either direction through this valve in accordance with the setting of a solenoid operated fuel pilot valve and the relationship between the valve inlet and outlet pressures. In particular, during filling of the auxiliary tank, when fuel flows in a reverse direction through the transfer valve from outlet to inlet, the valve outlet pressure exceeds the inlet pressure. In this case, the fuel pilot valve is in a normally closed position to prevent fuel transfer. When the solenoid is actuated, the fuel pilot valve moves to an open position to open the transfer valve thus allowing fuel to flow in the reverse direction to fill the auxiliary tank. On the other hand, for fuel flow in the forward direction from the auxiliary to the main tank, the inlet pressure is substantially greater than the outlet pressure and the operation of the fuel pilot valve is reversed. With the solenoid operated fuel pilot valve in its normally closed position, the transfer valve permits continuous transfer of fuel in the forward direction, except when air or other gases are present at the valve inlet. The presence of air is sensed by a float operated pilot valve arrangement which operates during fuel transfer in the forward direction to close the valve while the air or other gas is purged from the fuel line.

In accordance with more particular aspects of a preferred embodiment of the invention, the transfer valve may consist of a movable piston valve member slidably received within a hollow tubular baffle structure attached to the valve housing. The piston valve member moves outward from the baffle structure to contact a valve seat formed in the housing thus closing the valve. The space enclosed within the interior surfaces of the baffle structure and the piston valve member forms a piston chamber. An intermediate piston member, also slidably received within the hollow interior of the baffle structure, partitions the piston chamber into inner and outer piston chambers that can be separately pressurized. The outer piston chamber between the piston valve member and the intermediate piston member communicates either with the inlet or the outlet pressure of the valve, depending upon the setting of the solenoid operated fuel pilot valve. During fuel transfer in the forward direction, when the inlet pressure is substantially greater than the outlet pressure, energization of the solenoid places the fuel pilot valve in the open position to introduce the higher inlet pressure into the outer piston chamber which forces the piston valve member outward onto its seat, thus preventing further fuel flow. With the solenoid de-energized, the fuel pilot valve moves to the normally closed position, which vents the outer piston chamber to the lower outlet pressure and permits the piston valve member to unseat and allow the flow of fuel through the open valve. With the outlet pressure exceeding the inlet pressure for fuel flow in the reverse direction, the pilot valve operates to produce the opposite effect in opening and closing the transfer valve.

The inner piston chamber is normally vented through a restricted passage to the surrounding atmosphere, but also communicates through a float operated valve with the inlet. When pressurized liquid fuel is present at the inlet, the float operated valve is held closed by the buoyancy of the float. However, if air or other gas is present, the float is no longer buoyed up, and thus moves downwardly to open the float operated pilot valve. The high pressure of the air or other gas at the inlet enters into the inner piston chamber through the open float operated pilot valve to force the intermediate piston member outwardly against the piston valve member causing it to seat, thus preventing further fuel flow. The high pressure gas present at the inlet is then gradually vented from the inlet and the inner piston chamber through the restricted passage to the atmosphere. However, the buoyant float arrangement can only be effective in indicating the presence of air during normal positive G conditions. To prevent the passage of air during zero or negative G conditions, a pivoted weight arrangement is provided to override the normal operation of the float so as to maintain the float operated pilot valve open during negative G conditions. This causes the piston valve member to seat and remain closed until positive G conditions are restored.

Alternatively, instead of the piston type valve arrangement, the basic arrangement of this invention is equally applicable to other types of valves such as the commonly employed diaphragm-type valves. In such an arrangement, for example, the valve member which seats and unseats to control the liquid transfer is mounted for movement on a diaphragm at the outer end of the pressure chamber. An intermediate diaphragm is disposed within the pressure chamber to divide it into upper and lower chambers that can be individually pressurized. An extension member is provided between the two diaphragms so that the expansion of the intermediate diaphragm to its outer position forces the outer diaphragm to its outer position to seat the valve member to prevent further flow. In this alternative arrangement, the inner and outer pressure chambers defined by the diaphragm correspond to the inner and outer piston chambers in the previously described preferred embodiment, and the other valve components operate correspondingly.

In accordance with another particular aspect of this invention, the liquid transfer valve may be combined to operate in conjunction with a selectively controlled gas valve that is actuated to pressurize the liquid fuel in the auxiliary tank so as to force it out through the liquid transfer valve to the main tank. The gas valve typically may also contain a movable piston valve member which is normally urged by spring tension against a valve seat at the inlet. In the preferred form, the high gas pressure at the inlet communicates through a small opening in the face of the piston valve member with a piston chamber formed within the piston valve member. The piston chamber is also vented through a solenoid operated air pilot valve to atmosphere. When the air pilot valve is closed, the pressurized gas reaching the piston interior through the small opening is not vented, thereby equalizing the forces on both sides of the valve face so that the gas valve remains closed. When the solenoid is operated to open the gas pilot valve, the high pressure gas within the piston chamber is vented to atmosphere so that the force of the high pressure gas on the valve face unseats the piston valve member to permit the high pressure gas to flow through to pressurize the axiliary tank. In opening, the piston valve member also moves to close off a vent passage from the auxiliary tank to atmosphere. When the solenoid is de-energized, the gas pilot valve closes to prevent the escape of high pressure air from the piston chamber, thus causing the movable piston valve member to seat to stop further high pressure gas flow to the tank while at the same time uncovering the vent passage to atmosphere. In accordance with an alternative embodiment of the invention, the solenoid operated pilot valves for the fuel transfer and air valves are interlocked so that, whenever the air valve solenoid is energized, the transfer valve solenoid is deenergized. Thus, when the auxiliary tank is pressurized by opening the air valve, the transfer valve is also opened to transfer fuel continuously, except when air is present at the inlet.

These and other aspects of this invention are best understood and appreciated by considering the following detailed description taken in conjunction with the accompanying drawing, in which:

FIG. 1 is a schematic cross-sectional view of a preferred embodiment of a solenoid operated fuel transfer valve arrangement in accordance with the invention for use in aircraft an other vehicles;

FIG. 2 is a schematic circuit diagram illustrating a particular solenoid energizing arrangement for use with fuel transfer valve arrangements in accordance with the invention; and FIG. 3 is a schematic cross-sectional view illustrating an alternative embodiment of the invention.

The preferred embodiment shown in FIG. 1 has a housing or body 10 adapted to be connected with appropriate liquid and gas handling conduits (not shown). Although shown schematically herein as a unitary structure, the housing 10 is fabricated in joined sections with appropriate chambers and connecting passages therein as hereinafter described.

The structure of the fuel transfer valve is contained within the housing 10 to control the flow of fuel between a fuel inlet 12 and a fuel outlet 14. It should be understood that the terms "inlet" and "outlet" are used herein in a manner consistent with fuel flow in the upward direction through the fuel transfer valve of FIG. 1, even though flow takes place in both directions. For the intended application to the fuel transfer systems of aircraft, the fuel transfer valve 11 is disposed in a fuel line (not shown) connecting the aircraft's main fuel tank to an auxiliary tank. The inlet 12 is coupled to the auxiliary tank, and the outlet 14 is coupled to the main fuel tank. The auxiliary tank is filled by pumping fuel under pressure in the reverse direction through the valve 11 from the outlet to the inlet 12.

In one preferred embodiment of the invention, as shown in FIG. 1, a tubular valve chamber 16 is formed within the housing 10 between the inlet 12 and the outlet 14 with an inwardly facing chamfered valve seat 18 at the upper or outlet end of the valve chamber 16. A baffle structure 20 having a hollow, tubular interior closed at its lower or inlet end and open at the other end is fixedly supported within the valve chamber 16 so as to form an annular fuel conduit in the space between the outer walls of the baffle structure 20 and the interior walls of the valve chamber 16. The exterior of the closed end of the baffle structure is shaped to divert liquid fuel flowing from the valve inlet 12 into the annular conduit with a minimum of turbulence. The hollow, tubular interior defines a piston chamber for slidably receiving through the open end a piston valve member 24 that seats against the valve seat 18 when in an upwardly extended position.

An intermediate piston member 26, also slidably received within the piston chamber 22 between the piston valve member 24 and the closed end of the baffle structure 20, separates the piston chamber into separate upper and lower chambers 28 and 30, respectively, which can be independently pressurized. The piston valve member 24 is a hollow tubular structure with one end closed to form a solid valve base and having a guide member 32, in this case centered along the longitudinal axis of the piston chamber extending from the closed end along the central axis of the baffle structure into the hollow interior. Similarly, the hollow baffle structure 20 has a guide member 34, also centered in this embodiment, extending upwardly from its closed end along the central axis of the tubular chamber 22. These guide members 32 and 34 are slidably received in upper and lower central tubular guideways 36 and 38 formed on the intermediate piston member 26. Grooves 42, or appropriate connecting passages, formed in either the guide members or the guideways permit the liquid or gas within the respective surrounding upper or lower chambers 28 or 30 to flow freely into and out of any space existing at the end of the guide members and within the guideways so that the piston members 24 and 26 are free to move relative to one another and to the fixed baffle structure 20 without causing fluid entrapment. A coil spring 44 surrounding the upper guideway 36 in the upper chamber 28 biases the piston valve member 24 outward away from the intermediate piston member 26 toward a normally closed position. Similarly, a coil spring 46 surrounding the lower guideway 38 in the lower chamber 30 biases the intermediate piston member 26 outward toward the piston valve member 24 to urge it towards its normally closed position. Preferably, the spring 46 is slightly stronger than the spring 44 to maintain the piston member 26 against the piston valve member 24 under conditions where the pressure is equal in the inner and outer chambers so that, when air is detected at the inlet 12, the transfer valve closes with minimum delay.

The upper piston chamber 28 is connected through a passage 48 in the valve body 10 to a pilot valve chamber 50 within which is a ball-type pilot valve 52 operated by a solenoid 54. With the solenoid not actuated, a spring 53 surrounding the solenoid shaft biases the pilot valve 52 toward a normally closed position in which it is held against a seat on the left to seal off a passage 56 connecting the valve inlet pressure to the pilot valve chamber 50. When the solenoid 54 is actuated, the bias force of the spring 53 is overcome, and the pilot valve 52 moves to an alternative position against a seat on the right to close off a passage 58 leading from the valve outlet 14 to the pilot valve chamber 50, while opening the passage 56 to the inlet. The position of the pilot valve 52 selectively controls opening and closing of the piston valve member 24 depending on the relationship between the inlet and outlet pressure as hereinafter described.

When the valve inlet pressure is substantially greater than the outlet pressure, that is, during fuel transfer from the auxiliary tank to the main fuel tank in an aircraft, the operation is as follows. With the pilot valve 52 in the normally closed position shown in FIG. 1, the higher inlet pressure is sealed off from the pilot valve chamber 50, and the lower outlet pressure is communicated to the upper piston chamber 28 through the passage 58, the pilot valve chamber 50 and the passage 48. Since the lower outlet pressure exists on both sides of the valve face, the resulting low pressure forces are substantially balanced, except for a small net upward force due to the piston area being larger than the area of the valve face exposed to the outlet pressure. However, the chamfered valve seat 18 being smaller than the valve face allows the higher inlet pressure to be applied downwardly on an annular area along the outer rim of the valve face to produce a total net downward force sufficient to overcome the biasing force of the spring 44, thus unseating the piston valve member 24. Fuel trapped in the upper chamber 28 escapes through the unoccupied pilot valve seat on the right to allow the piston valve member 24 to move down ward to a fully open position to permit fuel flow in the forward direction through the valve from inlet to outlet. On the other hand, when the solenoid 54 is actuated to move the pilot valve 52 to its alternative position against the seat on the right of the chamber 50, the passage 58 is sealed off from the pilot valve chamber 50, and the higher inlet pressure communicates through the now uncovered passage 56, the pilot valve chamber 50 and the passage 48 to the upper piston chamber to be applied to the under side of the piston valve member 24, thus creating a net force upwards to move the face of the piston valve member 24 against its seat 18 to prevent further fuel flow.

In the opposite situation, where the valve outlet pressure exceeds the inlet pressure, as during filling of the auxiliary tank, the alternative positions of the pilot valve 52 have the opposite effect in controlling the opening and closing of the piston valve member 24. With the solenoid 54 actuated and the pilot valve 52 in its normally closed position on the left hand seat, the higher outlet pressure is applied to the upper chamber 28. Since the area on the underside of the piston valve member to which the higher outlet pressure is applied is greater than the area to which the same pressure is applied on the upper face, a net upward force results to hold the piston valve member 24 closed against its seat 18. On the other hand, with the solenoid 54 actuated to place the pilot valve 52 against its right hand seat, the lower inlet pressure is present within the upper chamber 28, and higher outlet pressure on the upper face of the piston valve member 24 produces a net downward force sufficient to overcome the upward force of the spring 44, thus unseating the piston valve member 24 to open the valve. Liquid fuel trapped within the upper chamber 28 is allowed to escape through the unoccupied piston valve seat on the left to the valve inlet, thereby permitting the piston valve member 24 to move to a fully open position so that fuel can flow in the reverse direction from the valve outlet 14 to the inlet 12.

As previously explained, when the auxiliary fuel tanks on an aircraft are detachably mounted to be jettisoned during emergency, fuel should be continuously transferred from the auxiliary storage tanks to maintain the main fuel tanks full. This insures maximum remaining fuel and minimizes fuel loss should the auxiliary tanks be jettisoned. Also, if the main fuel tanks are full, then no air is present to enter the main fuel lines during zero and negative G conditions to cause engine malfunctions. However, pressurized air is normally used to force fuel from the auxiliary tanks through the transfer valve to unpressurized main fuel tanks, and the auxiliary tanks should be continuously pressurized to sustain the fuel flow for keeping the main fuel tank full. To prevent this high pressure gas from entering the main fuel tank, the transfer valve is provided with a float operated pilot valve arrangement to sense the presence of air at the transfer valve inlet and thereupon close the transfer valve while removing the air from the system. Thus, although the transfer valve remains open to the flow of liquid fuel in the forward direction, it automatically closes to prevent the passage of air into the main fuel tank.

As shown in FIG. 1, a float 62 is attached by means of an elongated horizontal lever arm 64 to a fixed pivot member 66 so that it moves in a roughly vertical direction within a float chamber 67. A pilot valve member 68 is affixed to the lever arm 64 between the float 62 and the pivot 66 to move vertically with the float 62. A spring 70 biases the float 62 to a downward position in which the pilot valve member 68 unseats to allow the pressure present at the valve inlet to communicate through the unoccupied pilot valve seat, a chamber 72 and a connecting passage 74 with the lower piston chamber 30. When liquid fuel is flowing in the forward direction from the inlet 12 to the outlet 14, the liquid fuel fills the float chamber 67, and the upward buoyant force on the float 62 overcomes the downward force of the spring 70 causing the float operated pilot valve 68 to set. On the other hand, if air is present at the valve inlet 12, it will enter the float chamber 67 so that there is no longer a buoyant force of the float 62. As the unbuoyed float 62 moves downward by the force of gravity, the pilot valve member 68 unseats permitting the high pressure air at the inlet 12 to enter the chamber 72 and pass through the passage 74 to the lower piston chamber 30. The high pressure forces the intermediate piston member 26 upwards against the bottom of the piston valve member 24 causing it to seat, thus closing the transfer valve to prevent further fuel flow. A vent passage 76 connects the chamber 72 to atmospheric pressure. The vent passage 76 is restricted to leave only a small aperture 78 that offers sufficient resistance to the outflow of the high pressure air to create a substantial back pressure within the valve chamber 72 and the lower piston chamber 30 sufficient to maintain the valve closed. Eventually, when all the high pressure air at the valve inlet 12 is vented through the aperture 78 in the passage 76, liquid again fills the float chamber 67, again raising the float 62 to reseat the pilot valve member 68. Thereafter, as the high pressure air left in the inner piston chamber 30 continues to flow through the vent passage 76, the pressure drops until there is no longer a net upward force on the intermediate piston member 26 to hold the piston valve member 24 against its seat 18. The transfer valve then opens to resume the transfer of liquid fuel.

However, during negative G conditions that frequently occur in the maneuvers of modern high performance aircraft, the buoyant forces on the float 62 resulting from liquid filling the float chamber 67 are reversed. Likewise, the effect produced by the absence of any liquid in the float chamber 67 is also reversed so that the float operated pilot valve arrangement would not properly respond to the presence of air at the valve inlet 12. As a consequence, during negative G conditions, the float operated pilot valve arrangement would act to open the transfer valve at the very time high pressure air is present, thus admitting high pressure air into the main fuel tank through the transfer line. Since air is most likely to enter the valve inlet conduit from the auxiliary fuel tank as a result of zero and negative G conditions, the float operated pilot valve arrangement is provided with a negative G override mechanism to hold the float 62 in the downward position, thus preventing the pilot valve member 68 from seating during negative G conditions. In the preferred embodiments shown in the drawings, a suitable negative G override is provided by a weight 80 supported at one end of a rocker arm 82 that has a detent 84 at the other end for engaging the float lever arm 64. The rocker arm 82 pivots about a fixed point so that as the weight 80 moves upwards under negative G conditions, the detent 84 at the other end moves downward to engage the float lever arm 64 holding it in the downward position. Under normal positive G conditions, the weight 80 rests against the bottom of the float chamber 67 in its downward position so that the detent 84 is held out of contact with the float lever arm 64 to permit normal opening and closing of the pilot valve 68 by movement of the float 62. Under zero G conditions, when neither the float arrangement nor the override mechanism are operative, the float spring 70 applies a light downward force to hold the float 62 in the downward position, thus keeping the pilot valve member 68 unseated. Therefore, both during zero and negative G conditions, the pilot valve is open to admit high pressure into the lower piston chamber 30 to hold the transfer valve closed at those times when air is most likely to be present in the fuel transfer line.

Also included within the valve body 10 as a part of the transfer valve arrangement in accordance with this invention is a solenoid operated air valve 86 for selectively admitting pressurized air or other gas into the auxiliary tank in order to force the liquid fuel out through the liquid transfer valve. With the air valve 86 open, pressurized air is free to flow from an inlet opening 88 through an air valve chamber 89 to an outlet 90. The air valve inlet 88 is attached to an appropriate conduit from a compressor or other source of pressurizing air or other gas. Normally, air is used for pressurizing the auxiliary tank since it is most readily available, but some times inert gases such as nitrogen will be used to minimize the dangers of a conflagration. The air valve outlet 90 is coupled to an appropriate conduit through the pylon or other tank supporting structure to the interior of the auxiliary tank.

The air valve chamber 89 formed in the valve body 10 has an inwardly facing valve seat at its upper or inlet end, which is adapted to engage a movable piston valve member 92. The movable piston valve member 92 consists of a hollow tubular section partially closed at its upper end and open at the lower end. The hollow tubular interior of the piston valve member 92 slidably engages a flange 94 formed on the fixed guide member 96 with a substantially air tight fit. The guide member 96 extends above the flanged portion 94 through an aperture 98 of slightly larger diameter formed in the partially closed upper end of the piston valve member 92, the outer surface of which is the valve face. The hollow interior of the movable piston member 92 defines an annular piston chamber 97 surrounding the upward extension of the guide member 96 in the space above the upper surface of the flange 94. A coil spring 98 surrounding the upward extension of the guide member 96 biases the movable piston member 92 upwards toward a closed position against the inwardly facing valve seat. In addition, a tapered valve seat 100 is formed adjacent the open end of the movable piston valve member 92 surrounding an aperture leading from the valve chamber 89 to the atmospheric vent passage 78. When the piston valve member 92 is at its upper or closed position, this aperture is uncovered, thus venting the auxiliary through the valve outlet 90 to atmosphere. On the other hand, when the movable piston valve member 92 moves downward to allow high pressure air flow through the valve inlet 88, its open end engages the tapered valve seat 100 to close off the aperture leading to the atmospheric vent 78.

The air valve 86 is selectively controlled by the operation of the solenoid controlled, ball-type pilot valve 102 located in the pilot valve chamber 104. The pilot valve 102 is urged by a spring 105 to a normally closed position against its seat to close off an air passage 106 leading from the pilot valve chamber 104 through the body 10, a connecting conduit 108 and the hollow center of the guide member 96 to the piston chamber 97. The pilot valve chamber 104 is always open to the atmospheric vent pressure through another air passage 110. Thus, when the pilot valve 102 is unseated by actuation of an air valve control solenoid 112, the piston chamber 97 is vented to atmosphere.

In operation, the high pressure air or other gas is present at the valve inlet 88, and with the valve closed applies a downward force on the valve face at the upper surface of the movable piston valve member 92. Since the aperture in the piston valve member 92 has a slightly larger diameter than the upper end of the guide member 96, a restricted annular shaped air passage permits high pressure air at the inlet 88 to enter the piston chamber 97. With the pilot valve 102 seated, the pressurized air entering the piston chamber cannot escape so that eventually the pressure is equalized on both sides of the valve face. The upper end of the piston valve member 92 has tapered sides so that the valve face is roughly equal in area or slightly smaller than the cross-sectional area of the piston chamber 97. Thus, since the pressures are equal and the area within the piston chamber 97 is either equal or slightly larger than the area of the valve face, the spring 98, either alone or in conjunction with the added upward force of the differential pressure face, produces a net closing force in the upward direction to maintain the piston valve member 92 on its seat for all values of inlet pressure, thus preventing the high pressure air from flowing through the valve. Also, with the piston valve member 92 held in the upper position, the opening to the atmospheric vent is left uncovered so that the auxiliary tank is vented to atmosphere pressure through the valve outlet 90, the valve chamber 89 and the atmospheric vent 78. On the other hand, when the control solenoid 112 is actuated, the piston chamber 97 is vented to atmosphere pressure through the passage 106, the pilot valve chamber 104, and passage 110 to the atmospheric vent 78. The restricted air flow through the annular opening through the valve face is not sufficient to maintain the previous high pressure within the piston chamber 97, thus resulting in a net downward force on the piston valve member 92 which unseats and moves to a fully open position. The open end of the piston valve member 92 seats against the tapered valve seat 100 closing off the opening to the atmospheric vent 78 and pressurizing air is then free to flow from the valve inlet 88 through the valve chamber 89 and the outlet 90 to pressurize the auxiliary tank. When the solenoid 112 is deenergized, the passage 106 is closed off and inlet pressure is restored in the piston chamber 97. Since the pressure forces on opposite sides of the piston valve member 92 are equalized, the upward force of the spring 98 dislodges it from the vent seat 100 and starts it upward. As the face nears the inlet valve seat, the resulting pressure drop across the seat promotes further closure until the valve is completely closed.

The embodiment of the invention illustrated in FIG. 1 thus provides a fuel transfer valve arrangement, including both the fuel transfer valve itself and a gas pressurizing valve, which is solenoid controlled to permit the initial filling of an auxiliary tank and thereafter continuous air pressurization of the auxiliary tank so that fuel can be transferred on a substantially continuous basis through the liquid fuel transfer valve to an unpressurized main fuel tank to keep it full. During filling of the auxiliary fuel tank, the solenoid 54 is energized to maintain the liquid fuel transfer valve 11 open under the force of the applied fuel pressure at the valve outlet 14, and the air valve solenoid 112 is maintained deenergized so that the auxiliary tank is vented to atmosphere through the air valve outlet 90. On the other hand, during flight when the fuel in the auxiliary tank is to be transferred to keep the main fuel tanks full, the air valve solenoid 112 is energized to pressurize the auxiliary tank and the solenoid 54 is kept deenergized. With the auxiliary tank pressurized, the liquid transfer valve 11 acts automatically to transfer the liquid fuel continuously to keep the main fuel tank filled, except when air at the valve inlet 12 is sensed by the float operated pilot valve arrangement causing the valve 11 to close and remain closed until the air has been purged. After the air is purged, the valve 11 can again open to resume the transfer of liquid fuel. If desired, the fuel transfer from the pressurized auxiliary tank can be stopped by energizing the control solenoid 54, while maintaining the pressurization of the auxiliary tank.

However, the valve may be modified in one of several different ways to achieve fuel transfer whenever the auxiliary tank is pressurized, independent of whether or not the solenoid 54 is energized. In order to permit fuel transfer when the solenoid is energized, a simple ball check valve arrangement may be located in the passage 56 to prevent flow in the direction from the transfer valve chamber 16 into the pilot valve chamber 50. In addition, a ball-type pilot valve arrangement operated by energization of the air valve solenoid 112, or an additional solenoid in circuit therewith, would be situated in a passage (not shown) between the pilot valve chamber 50 and the valve outlet 14 so as to permit the escape of fuel from the upper piston chamber 28 to the valve outlet.

However, referring now to FIG. 2, the same result can most easily be accomplished without the complication of additional valves and passages by use of a simple interlocking circuit arrangement to maintain the transfer valve control solenoid 54 deenergized whenever the air valve control solenoid 112 is energized. As shown, an electrical power source 118 for energizing the solenoids 54 and 112 is connected through different parallel circuit paths to the transfer and air valve solenoids 54 and 112. The circuit path for the transfer valve solenoid 54 includes an energizing pushbutton 120 and a normally closed relay switch 122 connected in series between the source 118 and the solenoid energizing coils. With the relay switch 122 in its normally closed position, the transfer valve solenoid 54 is energized to open the transfer valve 11 by depressing the pushbutton 120. The other circuit connecting the source 118 to the air valve solenoid 112 has a pushbutton switch 124 connected in series with the actuating coil 126 of the normally closed relay switch 122. Whenever the pushbutton 124 is depressed to energize the air valve solenoid 122, current flows through the relay coil 126, thus opening the normally closed relay switch 122 to prevent the flow of energizing current to the transfer valve solenoid 54. The transfer valve solenoid 54 is therefore maintained deenergized whenever the air valve solenoid 112 is energized, independent of whether or not pushbutton switch 120 is closed. The same result may be achieved by various other electrical and mechanical arrangements that should be obvious to those skilled in the art; for example, the pushbutton switch 124 can be mechanically linked by a rocker arm and detent arrangement to prevent depression of the pushbutton switch 120 whenever pushbutton switch 124 is depressed.

The various mechanical components of the valve may be constructed of any suitbale material having the required structural strength and chemical compatibility with both the fuel and the gas used for pressurization. In a preferred practical embodiment of the invention, a bonded glass matrix consisting of glass filaments bonded by a suitable ductile filler is used in fabricating the valve body 10 and the other major valve components. The bonded glass matrix material takes advantage of the high yield strength of the glass filament, while the ductile filler makes the usually porous glass filament impervious to liquids or gases and imposes gradual stresses on the brittle glass filaments, which individually have poor impact resistance and ductility characteristics. More particularly, a bonded matrix material of 40% long fiber glass filaments bonded together with diallyl phthalate is relatively inexpensive and provides a rigid structure with good high temperature resistance. If the same glass fibers are bonded together with a modified phenolic, the resulting matrix material has a somewhat higher temperature resistance and strength, but may be slightly more expensive. If 40% glass filled nylon, the structure has good rigidity in thick sections and is compliant in thin sections to provide good pressure seals where needed. Another material of this character having good temperature resistance would be glass filled Teflon.

Referring now to FIG. 3, fuel transfer valves in accordance with the invention are not limited to the piston type shown in FIG. 1. For example, pilot operated diaphragm type fuel valves may also be used. In this type valve, a baffle structure 130 has a hollow tubular interior closed at its inlet end and opened at its outlet end to define a pressure chamber. The baffle structure 130 is mounted along the center axis of the valve chamber 16 so that an annular fuel conduit is formed through the housing. A movable valve member 132, the outer surface of which defines the valve face, is centrally mounted on a flexible diaphragm 134 that extends across the open end of the baffle structure 130 and is attached with a pressure tight seal to close the pressure chamber. Another movable member 136 is carried by a flexible diaphragm 138 that extends radially across the tubular interior to form an inner pressure tight seal intermediate the ends of the baffle structure 130, thus separating the pressure chamber into inner and outer pressure chambers 140 and 142. Guide members 144 and 146 extend from the closed end of the baffle structure 130 and the inner surface of the valve member 132, respectively, to be slidably received in guideways 148 and 150 formed on opposite sides of the movable member 136. As in the piston-type valve of FIG. 1, coil springs 152 and 154 surround the guide members and the guideways to bias the valve member 132 toward a normally closed position against the valve seat 18, the spring 152 urging the valve member 132 outward from the movable member 136 and the spring 154 urging the movable member 136 outward from the closed end of the baffle structure 130. The pressure conduit 48 from the fuel pilot valve communicates with the upper pressure chamber 140 and the conduit 74 from the float operated pilot valve communicates with the inner pressure chamber 142. Since the operation of this diaphragm-type valve is in most respects identical to that of the piston-type valve previously described in connection with FIG. 1, further description is not necessary herein. In fabricating such a valve, the diaphragms 134 and 138 may be formed of any flexible material chemically compatible with the liquid being transferred so as to avoid deterioration of the diaphragms due to chemical action.

The valves in accordance with this invention can easily be made to operate with desired differentials between the valve inlet and outlet pressures by proper design of the pressure areas on the various piston members with relation to the spring bias force. Usually both the fuel transfer valve 11 and the air valve 86 are designed to operate with pressure differentials in the order of 0.5 to 1.0 p.s.i. between the inlet and outlet.

Although preferred embodiments in accordance with the invention have been described and illustrated herein, it will be understood that various changes, modifications and equivalent arrangements other than those specifically mentioned herein may be employed, without departing from the spirit or scope of the invention as expressed in the appended claims.

What is claimed is:

1. A liquid transfer valve for controlling the flow of liquid through a fluid handling conduit comprising:
   a movable valve member having an open position to permit the flow of fluids and a closed position to prevent the flow of fluids therethrough;
   first control means responsive to the direction of flow for selectively moving said valve member to either of said positions;
   a float communicating with the fluid flowing in a given direction through said conduit upstream from said valve member, said float being buoyed to an upward position by the presence of liquid and assuming a lower position in the presence of gas; and,
   second control means responsive to movement of said float for moving said valve member to its closed position to prevent further fluid flow therethrough in the given direction when the float is in its downward position.

2. The transfer valve of claim 1 further comprising: sensing means including a vertically movable mass responsive to accelerational forces in the upwards direction for restraining said float in its downward position, thereby closing said valve member whenever accelerational forces occur in the upwards direction.

3. The transfer valve of claim 1 wherein said second control means includes an escape valve attached to move with said float, said escape valve being closed when said float is in its upwards position and open when said float is in its downward position to permit the escape of pressurized fluids present at said float, whereby pressurized gases present at said float are removed automatically to permit said valve member to reopen.

4. The transfer valve of claim 3 wherein said valve member comprises:
   a body defining a hollow tubular valve chamber having inlet and outlet apertures at opposite ends adapted to be connected to fluid handling conduits and having a valve seat formed at one end;
   a hollow tubular structure defining a piston chamber supported within said valve chamber to provide a fluid flow passage connecting the inlet and outlet apertures;
   a piston valve member slidably received within the piston chamber and seatable in its extended position on said valve seat to prevent fluid flow therethrough;
   means for biasing said piston valve to its extended position against said valve seat;
   a plurality of control passages connecting said piston chamber both to said valve chamber and to the one of said apertures on the other side of said valve seat;
   a pilot valve member for sealing a selected one of said control passages connected to said piston chamber and opening another of said control passages to admit pressure only on one side of said valve seat into said piston chamber; and
   said piston valve member having a cross-sectional area greater than the adjacent cross-sectional area of said valve seat so that a force is created on said piston valve member by the pressure within said valve chamber opposing said bias means whereby a net force is produced to unseat said piston valve member whenever the pressure admitted to said piston chamber is a given amount less than the other pressure.

5. The transfer valve of claim 4 wherein said float communicates with the fluid within said valve chamber, and further including another passage connecting said escape valve to admit the pressure within said valve chamber to said piston chamber when said escape valve member is open.

6. The transfer valve of claim 5 further comprising:
   an intermediate piston member slidably received within said piston chamber and dividing said piston chamber into first and second separate piston chambers;
   said plurality of passages connecting one of said separate piston chambers to said valve chamber and said one of said apertures on the opposite side of said valve seat, and said escape valve opening to connect said valve chamber to the other of said separate chambers.

7. The transfer valve of claim 6 further comprising: sensing means including a vertically movable mass responsive to accelerational forces in the upwards direction for restraining said float in its downward position, thereby closing said valve member whenever accelerational forces occur in the upwards direction.

8. The liquid transfer valve of claim 1 further comprising:
   spring means for applying a bias force in the downward direction on said float to restrain said float in its downward position during the absence of accelerational forces in the vertical direction.

9. In a liquid transfer system, a transfer valve arrangement for filling an enclosed liquid storage tank from an external fitting for continuously transferring the liquid contained within the tank under pressure to a location having a substantially lower pressure comprising:
   a gas valve for selectively admitting gas under pressure to pressurize the liquid contained within said tank;
   first valve control means for selectively operating said gas valve either to an open position for admitting gas under pressure to said tank or to a closed position for venting said receptacle to an unpressurized state;
   a liquid transfer valve having an inlet connected to communicate with the liquid stored in said receptacle and an outlet connected to said lower pressure location and to said external fitting, said liquid transfer valve including a movable valve member having an open position to permit the flow of fluid in either direction and a closed position to prevent the flow of fluids therethrough;
   second valve control means responsive to the direction of flow for selectively moving said valve member to either of said positions;

a float communicating with the flow of fluids from said tank toward said movable valve member, said float being buoyed to an upwards position by the presence of liquid and assuming a lower position in the presence of gas; and third control means responsive to the movement of said float for moving said valve member to its closed position to prevent further fluid flow from the receptacle when the float is in the downward position.

10. The transfer valve arrangement of claim 9 further comprising:

means including a vertically movable mass responsive to accelerational forces in the upwards direction for restraining said float in its downward position, thereby closing said valve member whenever accelerational forces occur in the upwards direction.

11. A transfer valve arrangement in accordance with claim 10 wherein said third control means includes:

an escape valve attached to move with said float, said escape valve being closed when said float is in its upward position and open when said float is in its downward position to permit the escape of pressurized fluids present at said float to said unpressurized state;

whereby pressurized gases present at said float during the transfer of liquid from said tank are removed automatically to permit said valve member to reopen.

12. The transfer valve arrangement of claim 11 wherein said liquid transfer valve comprises:

a body defining a hollow tubular valve chamber between said inlet and said outlet, and having a valve seat formed at the outlet end;

a hollow tubular structure defining a piston chamber supported within said valve chamber intermediate the inlet and outlet to provide a fluid flow passage;

a piston valve member slidably received within the piston chamber and seatable in its extended position on said valve seat to prevent fluid flow therethrough;

means for biasing said piston valve to its extended position against said valve seat;

a plurality of control passages connecting said piston chamber both to said valve chamber and to said outlet on the other side of said valve seat;

and wherein said second valve control means includes a pilot valve member for sealing a selected one of said control passages connecting said piston chamber either to the outlet or to the valve chamber while opening another of said control passages to admit the pressure on only one side of said valve seat into said piston chamber;

said piston valve member having a cross-sectional area greater than the adjacent cross-sectional area of said valve seat so that a force is created on said piston valve member by the pressure within said valve chamber opposing said bias means, whereby a net force is produced to unseat said piston valve member whenever the pressure admitted to said piston chamber is a given amount less than the other pressure.

13. The transfer valve arrangement of claim 12 wherein said float communicates with the fluid within said valve chamber, and further including another passage connecting said escape valve to admit the pressure within said valve chamber to said piston chamber when said escape valve member is open.

14. The transfer valve arrangement of claim 13 further comprising:

an intermediate piston member slidably received within said piston chamber to divide said piston chamber into first and second separate piston chambers;

and wherein said plurality of passages connect one of said separate piston chambers to said valve chamber and said outlet, and said escape valve opens to connect said valve chamber to the other of said separate chambers.

15. The transfer valve arrangement of claim 9 wherein:

said first valve control means includes means for selectively controlling said second valve control means to move said movable valve member toward an open position whenever said gas valve is in an open position.

16. The transfer valve arrangement of claim 12 wherein:

said first valve control means includes interlock means operable whenever said gas valve is in an open position for opening one of said control passages that connects said piston chamber to said outlet and for sealing another of said control passages to prevent fluid flow from said valve chamber into said piston chamber.

17. The transfer valve arrangement of claim 16 wherein:

said second valve control means further includes a spring-loaded solenoid for operating said pilot valve member, said pilot valve member being operable to seal the control passage connecting said piston chamber to said valve chamber when the solenoid is de-energized and to seal the control passage connecting said piston chambers to the outlet when the solenoid is energized;

and wherein said interlock means consists of means for maintaining said solenoid de-energized whenever said first control means is operated to place said gas valve in an open position.

18. In a liquid transfer valve for controlling the flow of fluids from a pressurized source to an unpressurized location, said valve having an open position to permit flow and a closed position against a valve seat to prevent flow, an arrangement for preventing the transfer of pressurized gasses while maintaining said valve in an open position for maintaining a substantially constant flow of liquid, comprising:

a float communicating with the fluid flowing towards said valve member, said float being buoyed to an upward position by the presence of liquid and assuming a lower position in the presence of gases;

control means responsive to movement of said float for closing said valve when the float is in the downward position;

and means including a vertically movable mass responsive to acceleration forces in the upwards direction for restraining said float in its downward position to maintain said valve closed whenever accelerational forces occur in the upwards direction.

19. The arrangement of claim 18 wherein said control means includes an escape valve attached to move with said float, said escape valve being closed when said float is in its upwards position and open when said float is in its downward position to permit the escape of pressurized fluids present at said float, whereby pressurized gas present at said float when accelerational forces are in the downward direction are removed to permit said valve to reopen.

References Cited

UNITED STATES PATENTS 1,124,564  1/1915  Wallmann _____ 137—44

CLARENCE R. GORDON, *Primary Examiner.*

U.S. Cl. X.R.

137—206, 434; 251—28, 29, 30, 31, 61.4 63.4